Nov. 5, 1929.   R. L. WILCOX   1,734,319
CLEARANCE MECHANISM FOR MISALIGNED ARTICLES
Filed Nov. 28, 1927
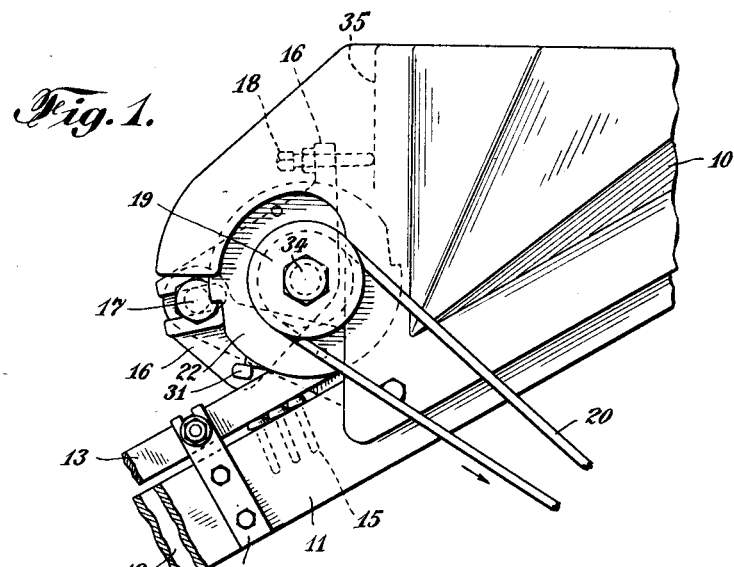
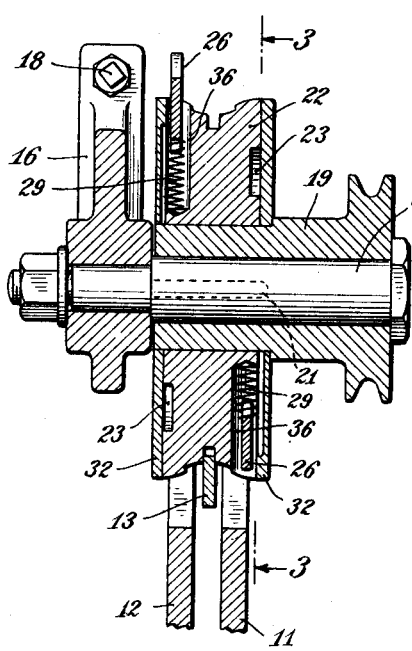
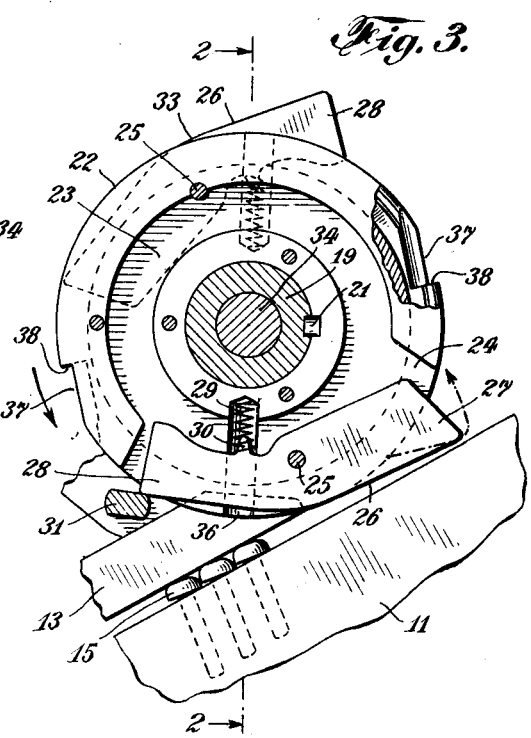
INVENTOR
Richard Lester Wilcox
BY George G. Hae
ATTORNEY Patented Nov. 5, 1929

1,734,319

UNITED STATES PATENT OFFICE

RICHARD LESTER WILCOX, OF WATERBURY, CONNECTICUT, ASSIGNOR TO THE WATERBURY FARREL FOUNDRY AND MACHINE COMPANY, OF WATERBURY, CONNECTICUT, A CORPORATION OF CONNECTICUT

CLEARANCE MECHANISM FOR MISALIGNED ARTICLES

Application filed November 28, 1927. Serial No. 236,281.

This invention relates to a clearance mechanism and refers to that type of such mechanism as is used to clear a chute or the like of all articles not in proper alignment.

Among other aims and objects of the invention may be recited the provision of mechanism as is used to clear a chute or the like chute of all improperly aligned articles by elements that will deliver a blow thereto of such force that the article will be knocked off the chute and will not require a second or subsequent blow to accomplish this result.

The improvements in the detail and arrangement of parts will be apparent from an inspection of the accompanying drawings, in connection with the description hereinafter contained, and wherein a preferred embodiment of the invention is disclosed for the purpose of imparting an understanding of the same.

In the drawings,—

Figure 1 is a side view of my improved clearing mechanism and adjacent associated parts;

Figure 2 is a transverse sectional view thereof, taken generally upon line 2—2 of Figure 3; and Figure 3 is a sectional side view thereof, the parts in section being taken generally upon line 3—3 of Figure 2.

Having more particular reference to the drawings, and in connection with which like reference characters indicate corresponding parts in the several figures; 10 indicates a portion of a hopper; 11 and 12 chute plates leading therefrom and associated therewith; 13 a cover plate which is adjustably supported above the opening between the chute plates by the plate 14.

The mechanism just described is old and constitutes no part of my present invention.

The hopper is usually provided with a mechanism that passes through a mass of articles therein and delivers them onto the top of the chute plates, which supports and guides them to a delivery point.

The form of articles shown in the drawings are bolt or screw blanks 15 or the like, which have been chosen merely for illustration, as the size and shape of the articles delivered from hoppers to chute mechanism are almost endless. Such of these articles or blanks 15 as are in correct alignment pass down the chute plates substantially as shown in the drawings with the shank thereof between the inside faces of the chute plates 11 and 12, and the head resting upon the top thereof, passing under the cover plate 13. Frequently, as the blanks are presented at the top of the chute by the hopper mechanism, some are at substantially a right angle to the length of the chute, and therefore do not pass under the cover plate and until removed prevent other blanks passing down through the chute.

My clearance mechanism relates particularly to a device for removing or ejecting from the chute such out-of-alignment blanks. It comprises a bracket 16, which is supported upon a bolt 17 secured in a fixed position and adjustable relatively to the hopper by a screw 18, the point of which impinges against a fixed wall 35.

In this bracket is a stud 34, upon which is a sleeve 19 that is rotated by a belt 20. Secured on this sleeve by the key 21 or the like, is a clearance wheel 22, in the opposite faces of which are the circular recesses 23, and the wall surrounding the same is cut away leaving two arcuate openings 24 in the periphery diametrically opposite each other.

Pivotally mounted in each of these openings upon the studs 25, is an ejecting lever 26 that is provided with a nose portion 27 and a tail portion 28. This lever is moved upon its pivot in one direction by a spring 29, which lies within a recess 36 and in engagement with the lug 30.

A fixed trip stud 31 projects across the face of the clearance wheel adjacent thereto and in the path of both of the levers 26. Attached to each side of the clearance wheel, and forming a closure for the recesses and levers 26 are the plates 32. The levers 26 are so arranged relatively to each other that during the rotation they pass over the top of the adjacent chute with a space therebetween sufficiently wide to permit the heads of the blanks 15 to pass therebetween. As the clearance wheel rotates in the direction of the arrow, the lever 26 engages the stud 31 at that part of the lever indicated 33 (Figure 3). The lever is rocked upon its pivot mounting by this stud and then assumes the position substantially as shown by the lower of the two levers 26, in Figure 3, during which time the nose travels outwardly from the clearance wheel in a path that is approximately parallel with the top of the chute plates.

During the movement of the lever 26 to its out position, the nose portion of the lever 26 engages any blanks out of alignment upon the chute and gives them a kick or push with sufficient force to cause them to fall therefrom and into the mass of blanks in the hopper. The approximate path of the nose of the lever 26 is indicated by the broken lines that terminate in an arrow head in Figure 3. After the tail portion has passed the stud 31 the spring returns the lever to its former position with the nose substantially flush with the periphery of the wheel 22. The end of this tail portion then rides on the top of the chute and assists in clearing therefrom any improperly aligned blanks that may have slid down the chute after the nose is returned to its in position.

In the periphery of the clearing wheel, substantially diametrically opposite each other, are two notches 37, the end wall 38 of which engages and clears the chute of any blanks which might fall upon the top thereof with the axis parallel to the length of the chute, and in which position it might pass between the inner faces of the ejecting levers 26.

There are minor changes and alterations that may be made within my invention, aside from those herein suggested, and would therefore have it understood that I do not limit myself to the exact description herein contained, but claim all that falls fairly within the spirit and scope of the appended claims.

What I claim as new and desire to secure by Letters Patent, is:—

1. In a clearance mechanism for article chutes or the like, a rotary member, a spring pressed article engaging element having a nose and a tail, means to pivotally connect said element to the member whereby as the nose leaves and approaches the chute the same lies within and the tail projects beyond the periphery of the member, and means to engage the tail so as to rock the element and cause the nose thereof to project beyond the periphery of the member as the nose reaches a predetermined point adjacent to the chute.

2. In a clearance mechanism for article chutes or the like, a rotary member, article engaging means having a kicking part, means to pivotally connect said means to the member so that said part normally lies within the periphery of the member, and means to actuate said first means so as to project said part beyond the periphery of the member at a predetermined point adjacent to the chute.

3. In a clearance mechanism for article chutes or the like, a rotary member, article engaging means having a kicking part, means to pivotally connect said means to the member so that said part normally lies within the periphery of the member, means to actuate said article engaging means so as to project said part thereof beyond the periphery of the member at a predetermined point adjacent to the chute, and means to restore said part to normal position after leaving said point.

4. In a clearance mechanism for article chutes or the like, a rotary member, article engaging means having a kicking part, means to pivotally connect said means to the member so that said part normally lies within the periphery of the member, and means to actuate said kicking means so as to project said part beyond the periphery of the member at a predetermined point adjacent to the chute, said rotary member being provided with a notch forming a wall located in advance of said kicking part to engage misaligned articles and thereby clear the chute.

5. In a clearance mechanism for article chutes or the like, a rotary member, a pair of article engaging means each having a kicking part located on opposite sides of the member and at substantially diametrically opposite points thereon, means to pivotally connect said article engaging means to the member so that said parts normally lie within the periphery of the member, and trip means for successively engaging and moving the article engaging means so that said parts thereof project beyond the periphery of the members.

6. In a clearance mechanism for article chutes or the like, a rotary member, a pair of article engaging means each having a kicking part located on opposite sides of the member and at substantially diametrically opposite points thereon, means to pivotally connect said article engaging means to the member so that said parts normally lie within the periphery of the member, a trip means for successively engaging and moving the article engaging means so that said parts thereof project beyond the periphery of the members, said rotary member being provided with a pair of notches forming walls located in advance of the respective kicking parts to engage misaligned articles and thereby clear the chute.

7. In a clearance mechanism for article chutes or the like, a rotary member, article kicking means having spaced parts, means to pivotally connect said kicking means to said member so as to allow its said parts to alternately project beyond the periphery of the member, and means to actuate the kicking means to cause one of said parts thereof to project beyond said member as said part reaches a predetermined point adjacent to the chute.

8. In a clearance mechanism for article chutes or the like, a rotary member, article engaging means having a kicking part normally disposed to lie within the periphery of said member, means to movably connect said kicking means to the member, and means to actuate the kicking means so as to cause said kicking part thereof to project beyond said member as said part reaches a predetermined point adjacent to the chute.

9. In a clearance mechanism for article chutes or the like, a rotary member, article engaging means having a kicking part normally disposed to lie within the periphery of said member, means to movably connect said kicking means to the member, and means to actuate the kicking means so as to cause said kicking part thereof to project beyond said member as said part reaches a predetermined point adjacent to the chute and means to restore said part to normal position subsequent to leaving said point.

10. In a clearance mechanism for article chutes or the like, a rotary member, a pair of opposed spaced article engaging members having kicking parts, means to movably connect said members to the rotary member so that in one position of each the same lie within the periphery of the rotary member, means to successively project said members outwardly of the periphery of the rotary member at a predetermined point adjacent to the chute, and stationary article engaging means carried by the rotary member and disposed in the spaces between the article engaging members.

In testimony whereof, I have hereunto affixed my signature.

RICHARD LESTER WILCOX.